United States Patent [19]

Whiting

[11] Patent Number: 4,622,695

[45] Date of Patent: Nov. 11, 1986

[54] CHANNEL SCAN ALLOCATION ARRANGEMENT

[75] Inventor: Douglas L. Whiting, South Pasadena, Calif.

[73] Assignee: Motorola, Inc., Schaumburg, Ill.

[21] Appl. No.: 704,987

[22] Filed: Feb. 25, 1985

[51] Int. Cl.[4] ............... H04B 1/00; H04B 7/00; H04M 11/00

[52] U.S. Cl. .................................. 455/58; 379/58

[58] Field of Search ............... 455/32, 34, 38, 59, 455/58; 179/2 E, 2 EA, 2 EB, 18 DA, 90 D; 340/825.34

[56] References Cited

U.S. PATENT DOCUMENTS 3,840,811 10/1974 Blouch .............................. 179/2 E
4,400,585 8/1983 Kaman et al. ........................ 455/54
4,467,141 8/1984 Resch et al. ....................... 179/2 EA Primary Examiner—Jin F. Ng
Assistant Examiner—Elissa Seidenglanz
Attorney, Agent, or Firm—Margaret Marsh Parker; James W. Gillman; John Moore

[57] ABSTRACT

Evenly distributed channel use and prevention of interference are achieved in a two-way communications system by using an ID code transferred between a pair of associated units such as a base and a portable telephone. The number of the first channel to be used, and the step value used for determining an alternate channel in case the first channel is being used by a second pair of units, are obtained from the ID code in such a manner as to prevent both pairs of units from switching to the same new channel.

7 Claims, 2 Drawing Figures

CHANNEL SCAN ALLOCATION ARRANGEMENT

BACKGROUND OF THE INVENTION

This invention relates to the field of communications devices and, more particularly, to devices including a channel scanning feature.

There are many systems in the field of communications which use channel scanning. The simplest system would begin at channel #1 and, if it is busy, proceed to the adjacent channel, then the next, etc., or perhaps start at the last channel used by the device and move to the next one. In some instances, however, there are valid reasons for not using this simple approach. If, for example, it is necessary to spread channel usage as evenly as possible over all of the available channels, it would be better to make the allocation of the initial channel in some random fashion. This is not difficult to accomplish, but channel interference problems would still remain since it is usually necessary to prevent multiple units from using the same channel at the same time. With a limited number of channels available within any given system, it is inevitable that occasionally two units will begin using the same channel at the same time. This is not a fatal flaw since each unit transmits for only a very brief period before listening on that same channel, and any unit hearing another transmission will automatically change channels. However, if both units are operating under a scanning system wherein the channel changed to is the adjacent channel, nothing will have been solved. The two units would still be competing for the use of that channel.

It is desired to solve these problems in a system wherein one unit, such as a cordless telephone, is paired with another unit, such as a base telephone unit, and an identification code is used to establish privacy for communications between the two.

SUMMARY OF THE INVENTION

It is an object of this invention, therefore, to provide a channel scanning arrangement wherein usage will be evenly divided among the available channels.

It is likewise an object to simultaneously provide for the minimum amount of co-channel interference between units in the system.

In the system utilizing the present invention, when a cordless telephone is first mated with a base unit for charging, an ID number or code is transmitted to the telephone and stored there permanently. This feature is the subject of one or more co-pending applications assigned to the assignee of this invention. Since this ID code is unique within the system, it can be used as the basis for individualizing the channel scanning operation also. It will be apparent that the transmitted number need not be an ID code, but it must be unique within the system. Also, the transmitted numbers must have a sequential relationship to each other, as will be understood.

In the present invention, two other numbers are also given to the telephone along with the ID code. These are termed the "primary channel" number and the "step value". Both of these two numbers have been derived from the ID code, thus they have effectively been randomized within the available range of channels. A given unit, having received the three related numbers and stored them in memory, will initiate its first communication on its "primary channel". If that channel should chance to be busy, the unit will shift automatically to its "secondary channel". The number of the secondary channel and all subsequent channel choices are also derived from the ID code number.

DETAILED DESCRIPTION OF THE PREFERRED EMBODIMENT

Figure 1:
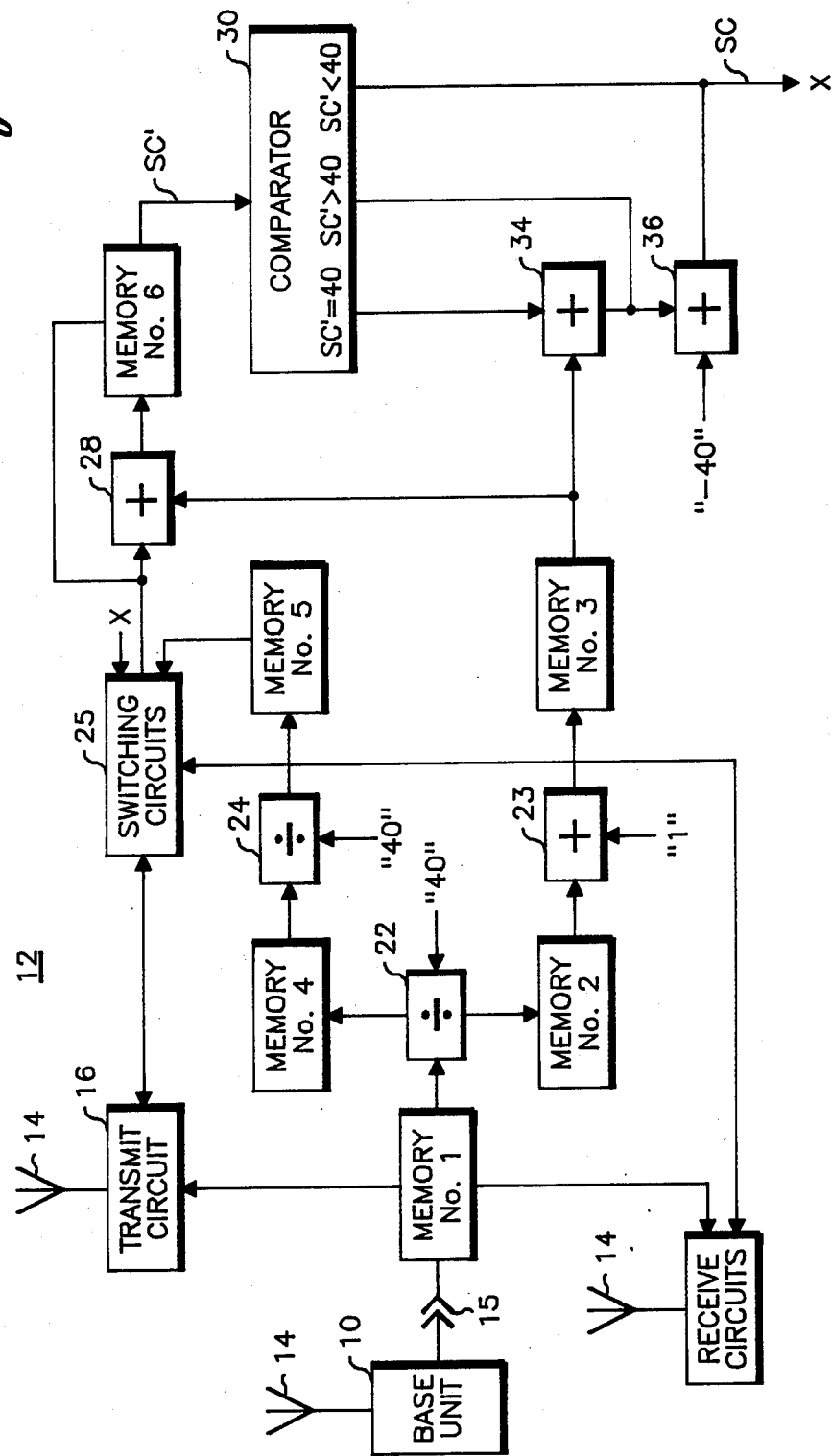
FIG. 1 is a block diagram of the invention.

FIG. 1 shows the invention in the form of discrete logic elements. It will be understood by those skilled in the art that such a diagram may also represent an embodiment including portions of a microprocessor and its associated memories. Also, some of the functions herein described, such as deriving the primary and secondary channel numbers and the step value, may be performed in either the base unit or the portable unit.

A base unit 10 may represent a telephone base unit, as in the present environment, or any other unit which is to be matched with a second unit such as a portable telephone unit 12 (partially shown).

In normal operation, the units 10 and 12 will be coupled together by a medium of communication which is available to other units, thus the need for an ID code. This medium could be radio transmission as indicated by the antennas 14, or a closed cable circuit (not shown) as is known. At the initial stage, however, the two units, 10, 12 will be joined, however briefly, by some secure form of communication such as the connector 15. During this temporary joining at least an identification code (ID) will be given to the unit 12 by the unit 10. This ID code will preferably be in binary form, and in the preferred embodiment is a 32 bit binary transmission (21 bit code +11 parity bits), as is well known in the art. The ID code, which is unique to this pair of units, will be stored in a memory #1. The memory #1 is coupled to a transmitter 16 and receiver 18 since the ID code is used in every transmission within this system. The ID code is also coupled to a divider 22 wherein it is divided by a divisor which is the number of available channels (40 in the present example). The remainder will then be a number less than 40. That remainder is stored in a memory #2 and coupled to an adder 23 where a "1" is added to it. That sum is called the "step value" and is the increment that will be added each time a new channel must be picked. The step value is stored in a memory #3.

The quotient of the division in the divider 22 is stored in a memory #4, then coupled to a divider 24 where it is again divided by 40. The remainder from this second division process is the "primary channel" number and it is stored in a memory #5 and coupled to a switching circuit 25. The primary channel number is the number of the first channel used when this particular unit begins to transmit. The unit may or may not begin with the primary channel at each transmission. Each ID code is unique and codes are chosen so that the primary channel numbers will be evenly spread over the available channels. The primary channel number is coupled from the switching circuit 25 to an adder 28 where it is added to the step value stored in memory #3. This sum may be the number of the next channel to be scanned when the primary channel is busy.

The "secondary channel" number is stored in a memory #6 from which it is coupled to a comparator 30.

The stored value, however, is termed SC' since it may be an invalid number, requiring modification. Comparator 30 checks this channel number to see if it is 40, less than 40, or greater than 40. If the number is 40, it is not a valid number in this system (since the channel numbers are here assumed to be 0-39). It is therefore coupled to an adder 34 where it is added to the step value, then coupled to another adder 36, where it is added to a negative 41. If the secondary channel number turns out to be more than 40, it is coupled directly to the adder 36, where it is added to a negative 41, thus providing a valid channel number. If the secondary channel number is less than 40 it is a valid number and it is coupled to the switching circuit 24 via line "X". The output of the adder 36 is also coupled to the switching circuit 25. The secondary channel number which is coupled to the switching circuit is termed SC.

The switching circuit is controlled by the receiver circuit in that when the unit is using a particular channel and the receiver detects another user on that channel, this unit will stop transmitting on the channel and the channel number will be coupled from the memory #6 to the adder 28 where the step value will be added to it. This new channel number will be coupled back through the memory #6 to the comparator 30. After being compared with 40 and adjusted as described above, the new channel number is coupled to the switching circuit and thence to the transmitter circuits 16. If, as could happen, that channel also turned out to be busy, the secondary channel number be coupled to the adder 28 where the step value from memory #3 will be added to it. This new number will be compared as before, and it, or the modification of it, will again be coupled through the switching circuit 25 to the transmitter circuits 16. This procedure could indeed be gone through as many times as there are channels in the system, if necessary, and the user would be entirely unaware of any problem.

Figure 2:
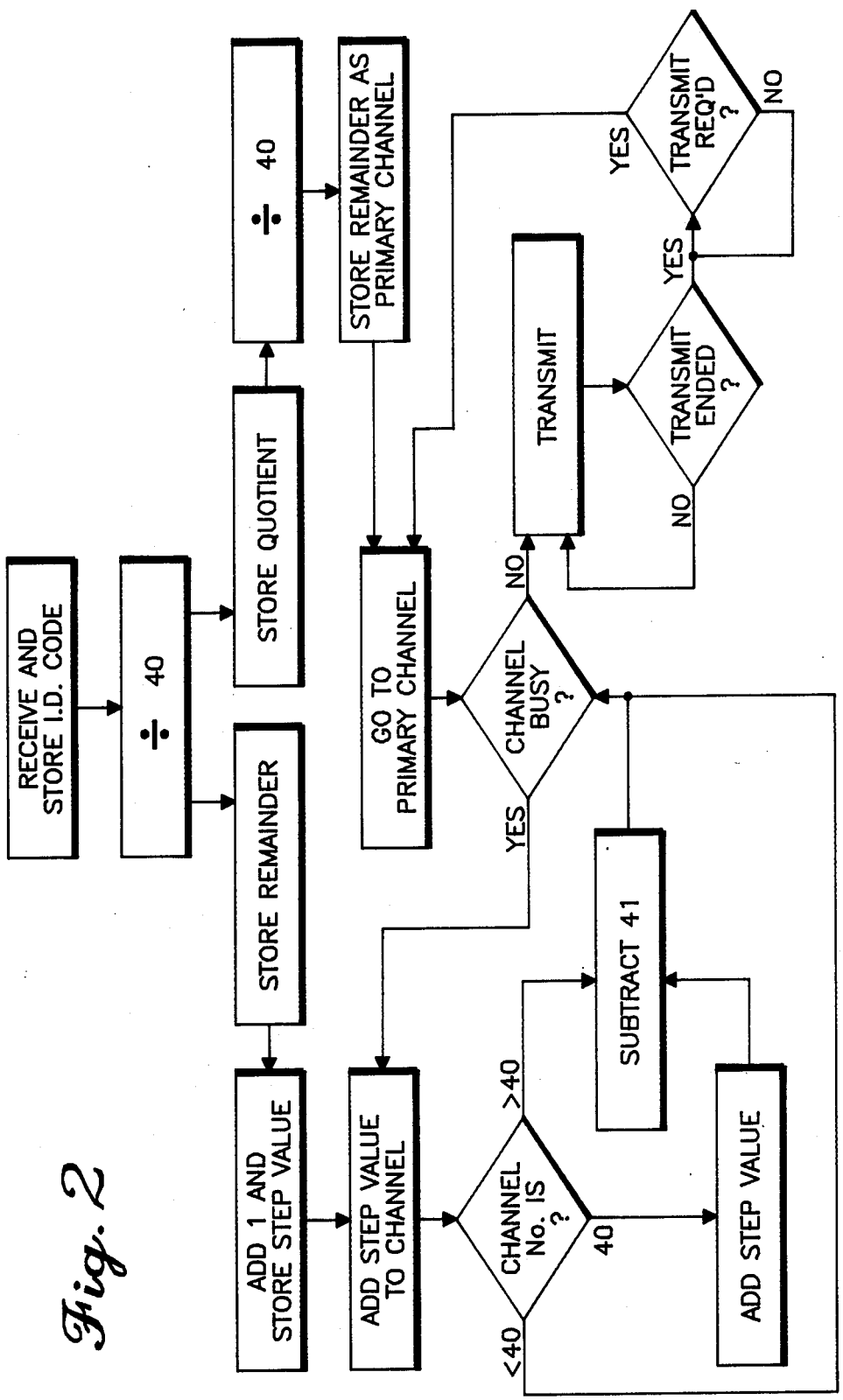
FIG. 2 is a flowchart of the operation of the invention.

FIG. 2 is a flow chart of the operation of this channel allocation arrangement. The chart has been simplified in that the control steps enabled by the receiver have been eliminated. First, the ID code is received from the base unit 10 and stored for use in the reception and transmission of messages by the unit 12. It is also stored for use in determining the proper channel for the unit 12 to use for any one transmission. Next the ID code is divided by 40 and the remainder stored (remainder less than 40). A "1" is added to the remainder and the sum stored for future use as the step value. The quotient from the division process is stored and divided by 40, then stored as the primary channel number. This channel is tried, but if it proves to be busy, the step value is added to it. A comparison with 40 is made as described with respect to FIG. 1, and the new channel is tried. If it, too, proves to be busy, the step value is added again and the new number compared with 40 again. This process will continue until an open channel is found for transmission. If this number is less than 40, it is a valid channel number, and the unit will be enabled to begin transmission on this channel. As before, if that channel is busy, the secondary channel number is added again added to the step value, and the new secondary channel number is checked for validity. If the secondary channel number is found to be greater than 40, 41 is subtracted from it. One other possibility exists; the secondary channel number could be exactly 40. In this case, the step value is added to the channel number, then "41" is subtracted from the number.

As an example of the operation of the channel allocation a numerical example will be given. Let us suppose that the ID code given to the unit 12 by the unit 10 is a binary code whose decimal equivalent is 37786. Upon dividing the decimal number by 40, the number of available channels, a quotient of 944 with a remainder of 26 is obtained. Since the step value is one more than that remainder, it is 27. When the quotient 944 is again divided by 40, a new remainder of 24 is obtained. The primary channel number, therefore, is 24. If, for a given transmission, the primary channel 24 is found to be busy, the unit's logic will add the step value of 27 to the primary channel number to obtain a new number which is, of course, 51. Since 51 is greater than the number of available channels, it is invalid and the logic will subtract 41 from it, obtaining 10, a channel value less than 40. This channel number will become the secondary channel number and the unit 12 will begin to use it. If, however, channel 10 is the also busy at this time, the logic will add the step value of 27 to 10, obtaining 37. Since 37 is a valid number, the unit will begin transmission on channel 37. In like manner, if channel 37 is busy, 27 would be added to it, obtaining 64, an invalid number greater than 40. When 41 is subtracted from 64, a valid number, 23, is obtained and used. It is easy to show that continuing this sequence will result in each of the 40 valid channel numbers (0-39) being chosen once in the first 40 tries. To emphasize the point made above, if two units begin using the same channel and both make the same jump to a new channel, they would still compete for each new channel switched to. In the present system, this continuing competition is avoided almost entirely.

There has been shown and described an arrangement whereby a highly desirable channel allocation is arrived at in a system using an ID code imparted to a portable unit by its base unit. The ID code may be given at only the initial contact between the pair of units, or may be given at each physical contact. Channel interference is reduced to an insignificant level and channel use is spread evenly over all the available channesl with no added complication for the user. Other modifications and variations are possible within the spirit of the invention and it is intended to cover all such as fall within the spirit of the appended claims.

I claim:

1. A channel scan allocation arrangement for a system utilizing a predetermined number (N) of channels, and comprising:

a first communication unit including a first transmitter and a first receiver;

a second communication unit including a second transmitter and a second receiver, an ID code being required for communication between the first and second units;

means for transferring at least the ID code from the first unit to the second unit;

first divider means for dividing the numerical value of said ID code by N, providing a whole number quotient and a first remainder;

first adder means for adding 1 to said remainder, to provide a step value SV;

second divider means for dividing said quotient by N, providing a first channel number PC;

second adder means for adding PC and SV to provide a second channel number SC';

logic means for comparing the value of SC' with the value of N to determine relative value and, when necessary, modifying SC' to obtain a value SC not greater than N; and a switcihng circuit coupled to the logic means for coupling either PC or SC to the second transmitter and the second receiver.

2. A channel scan allocation arrangement in accordance with claim 1 and including first storage means for storing said ID code and second storage means for storing the values of at least SV, PC and SC'.

3. A channel scan allocation arrangement in accordance with claim 1 and wherein said logic means includes comparator means for comparing SC' with N, and adder means coupled to the comparator means output for adding SV minus N minus 1 to SC' when SC' equals N.

4. A channel scan allocation arrangement in accordance with claim 1 and wherein said logic means includes comparator means for comparing SC' with N, and adder means coupled to the comparator means output for subtracting N plus 1 from SC' when SC' is greater than N.

5. A channel scan allocation arrangement in accordance with claim 1 and wherein said logic means includes comparator means for comparing SC' with N, and wherein SC' becomes SC when SC' is smaller than N.

6. A channel scan allocation arrangement for a system utilizing a predetermined number of (N) of channels, and comprising:

a first communication unit including a first transmitter and a first receiver;

a second communication unit including a second transmitter and a second receiver, and ID code being required for communication between the first and second units;

means for transferring at least the ID code from the first unit to the second unit;

first logic means for deriving from the ID code and N a first channel number PC for use by said second unit;

second logic means for deriving from the ID code and N a step value SV, and for combining PC and SV to form a second channel number SC; and switching circuitry having two-way coupling to the second transmitter and the second receiver, and coupled to the first and second logic means for controlling the channel number to be used in communication.

7. A channel scan allocation arrangement in accordance with claim 6 and wherein the means for transferring is a direct, physically connected means.

* * * * *